United States Patent [19]

Eigeldinger

[11] Patent Number: 4,991,025
[45] Date of Patent: Feb. 5, 1991

[54] ARRANGEMENT FOR AUTOMATICALLY SWITCHING A VIDEORECORDER ON AND OFF IN THE ABSENCE OF A CODE SIGNAL BUT IN PRESENCE OF A FBAS SIGNAL

[75] Inventor: Norbert Eigeldinger, Villingen-Schwenningen, Fed. Rep. of Germany

[73] Assignee: Deutsche Thomson-Brandt GmbH, VS-Villingen, Fed. Rep. of Germany

[21] Appl. No.: 357,674

[22] Filed: May 26, 1989

Related U.S. Application Data

[63] Continuation of Ser. No. 26,550, Mar. 2, 1987, abandoned.

[30] Foreign Application Priority Data

Jul. 6, 1985 [DE] Fed. Rep. of Germany ....... 3524270

[51] Int. Cl.$^5$ ............................................. H04N 9/491
[52] U.S. Cl. ..................................... 358/310; 358/335; 369/19; 360/33.1
[58] Field of Search ................... 300/83.1, 5; 358/310, 358/335, 86, 349, 908, 26, 142, 147; 369/19; 340/309.15; 368/10, 107, 108; 455/18, 70, 181, 186; 380/20

[56] References Cited

U.S. PATENT DOCUMENTS

| | | | |
|---|---|---|---|
| 4,015,090 | 3/1977 | Kitada | 369/19 X |
| 4,193,120 | 3/1986 | Yello | 369/19 X |
| 4,305,101 | 12/1981 | Yarbrough et al. | 358/908 X |
| 4,310,924 | 1/1982 | Miyasaka et al. | 455/181 |
| 4,435,842 | 3/1984 | Mayumi et al. | 369/19 X |
| 4,488,179 | 12/1984 | Krüger et al. | 358/147 X |
| 4,593,414 | 6/1986 | Koyanagi | 369/19 X |
| 4,626,909 | 12/1986 | Oniki et al. | 455/186 X |
| 4,631,601 | 12/1986 | Brugliera et al. | 360/33.1 X |
| 4,635,121 | 1/1987 | Hoffman et al. | 455/181 X |
| 4,706,121 | 11/1987 | Young | 358/142 |
| 4,787,063 | 11/1988 | Muguet | 364/900 |

FOREIGN PATENT DOCUMENTS

| | | |
|---|---|---|
| 0041121 | 12/1981 | European Pat. Off. . |
| 0118104 | 9/1984 | European Pat. Off. . |
| 0133985 | 3/1985 | European Pat. Off. . |
| 46-41135 | 12/1971 | Japan ................................ 358/26 |
| 52-60023 | 5/1977 | Japan ................................ 358/26 |
| 2034995 | 6/1980 | United Kingdom ............. 455/186 |

OTHER PUBLICATIONS

"Pas Digitale Fernshkeunungssytem ZPS", Krüger: Nachnihtenkchnische Zeitschnift, vol. 35, No. 6, Jun. 82, pp. 368-376.

Primary Examiner—Aristotelis M. Psitos
Attorney, Agent, or Firm—Max Fogiel

[57] ABSTRACT

The disclosed device enables the recording of television broadcasts which are preprogrammed in a memory. The presence of data lines of the television signal in combination with the presence of a color television signal is checked. When the data lines stop, the video recorder is switched on in real time by a clock time signal.

1 Claim, 3 Drawing Sheets

ARRANGEMENT FOR AUTOMATICALLY SWITCHING A VIDEORECORDER ON AND OFF IN THE ABSENCE OF A CODE SIGNAL BUT IN PRESENCE OF A FBAS SIGNAL

The present application is a Continuation of the parent application Ser. No. 026,550, filed Mar. 2, 1987, now abandoned.

The point of departure for the invention is a device of the type defined in the preamble to the claim and thoroughly described in German OS No. 3 328 001.

A device of this type is intended to control a videorecorder such that it will at the correct time record a television transmission stored by the user. The videorecorder is accordingly controlled by an event and not by time. This ensures that the desired television transmission will be correctly recorded even when the transmission is emitted due to chronological program displacement at a time that differs from the time programmed in. An identification signal that characterizes the particular program is accordingly emitted in a data line during the vertical blanking interval. As thoroughly described in the aforesaid German OS, the videorecorder is switched over to a standby system at a prescribed interval $t_1$ of time before the programmed-in point $t_s$. The standby-system motors are then switched on when the identification signal I appears, and recording begins.

It sometimes happens that the data lines fail to occur for some reason involving either the transmitter, the transmission path, or the data-line decoder. In the system employed by the known device the videorecorder is in that case immediately switched off, even though the actual transmission continues and could have been recorded. Especially when the videorecorder is in standby, while, that is, it is waiting for the identification signal to appear in the data line, there is a drawback in that a transmission is not recorded even though it is being broadcast.

The object of the invention is to maintain the videorecorder in a state in which it can be switched on even when the data line fails to occur before the programmed transmission begins and to make it possible to continue recording for a prescribed length of time. This object is attained by the invention recited in the claim.

The invention will now be explicated with reference to the drawings, wherein

Figure 1:
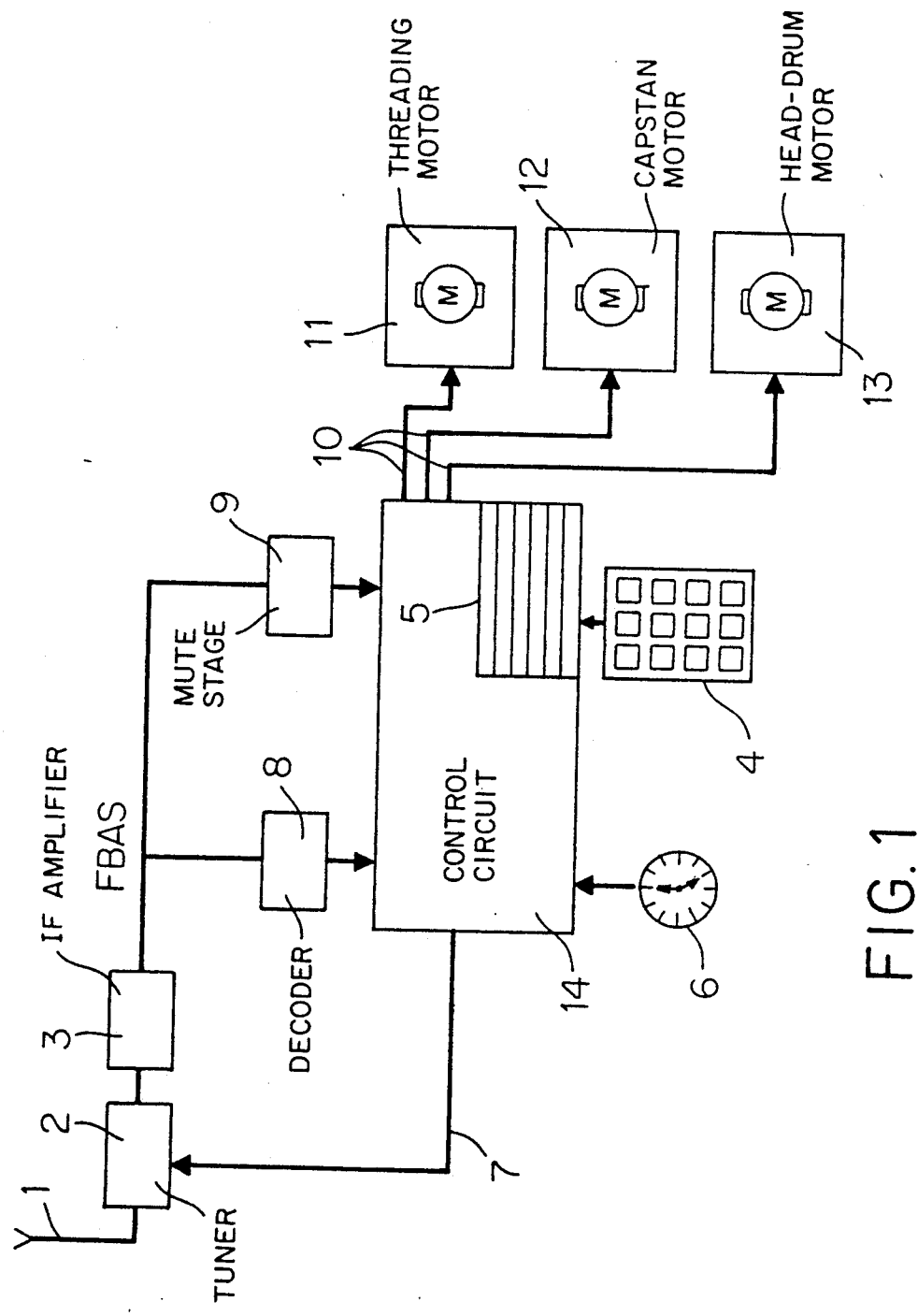
FIG. 1 is a circuit diagram of the invention.

FIG. 1 illustrates the components essential to the invention. A television signal arrives at a tuner 2 through an antenna 1. Tuner 2 converts the signal into an intermediate frequency available in the form of a composite color signal, also called an FBAS, signal at the output terminal of an IF amplifier 3. Transmitters can be entered at for example a keyboard 4, with their tuning values stored in the memory 5 of a control circuit 14. Videorecorders have a clock 6 that is set to real time. It is possible, by entering clock time $t_s$ along with the channel data for a transmitter signal that is to be recorded at a desired point of time, to switch the videorecorder on when real time $t_R$ agrees with the stored reference time $t_s$, whereby the tuning values arrive over a control line 7 at the tuner 2 that is to be adjusted.

When the recorder is prearranged in addition to time programming for starting a record by a transmitted identification signal, an identification decoder 8 identifies the data line and the identification signal included therein. Upon receiving the identification signal, the decoder 8 generates a control signal which affects controls 14 so that they will activate a threading motor 11, a capstan motor 12, and a head drum motor 13 through control lines 10 for starting the record.

In the case when the identification signal fails to appear, but when the real time $t_R$ as measured by clock 6 coincides with the stored reference $t_s$, a second stage 9 identifies whether an FBAS-signal is received or not. In case an FBAS-signal is received, the second stage 9 generates a second control signal which also affects controls 14 for starting a record in the same way, as described above.

Figure 2:
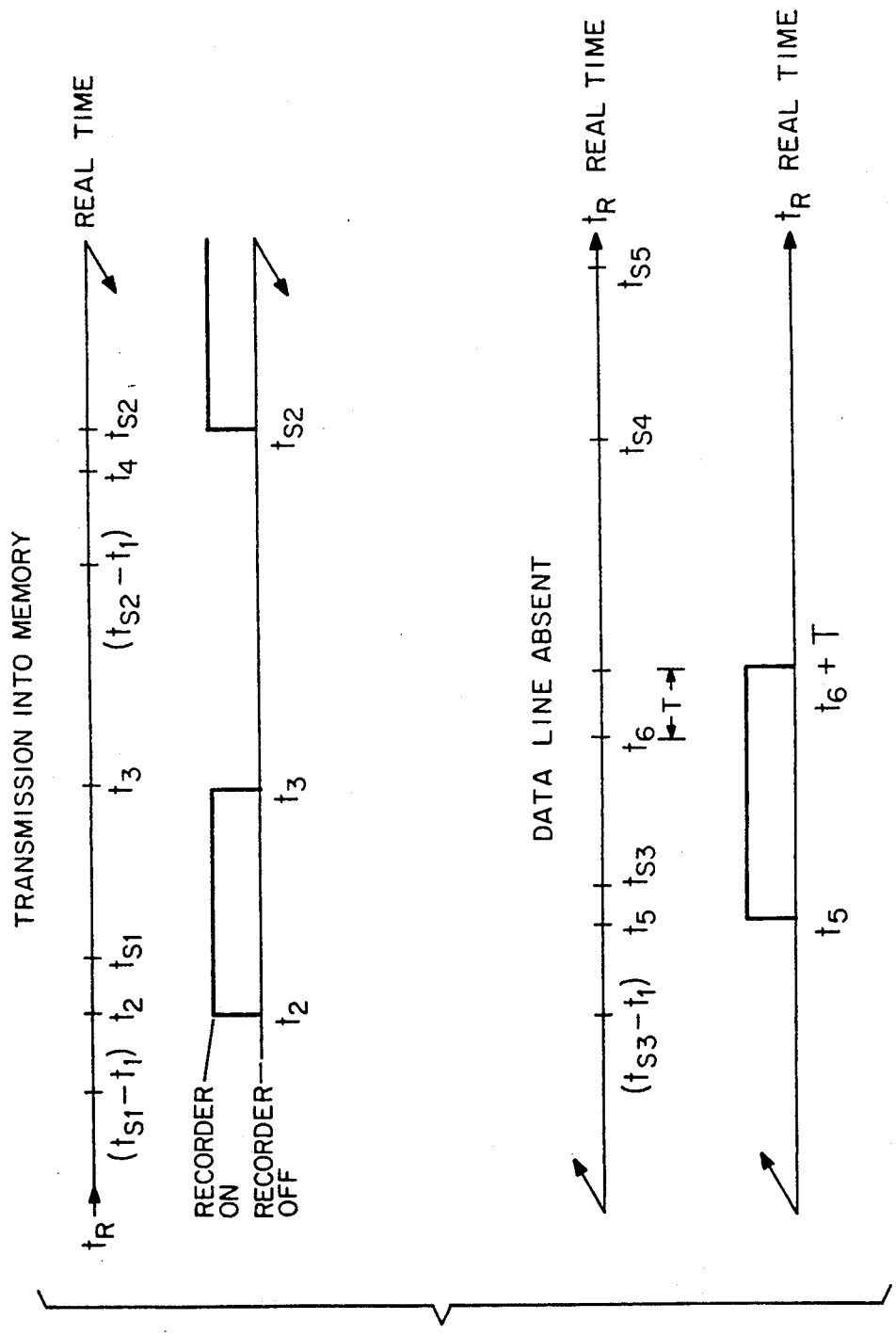
FIG. 2 is a graph explaining how the invention operates as a function of time.

FIG. 2 illustrates the passage of real time $t_R$. The times at which transmissions entered in memory 5 begin are entered at points $t_{s1}$, $t_{s2}$, $t_{s3}$, $t_{s4}$, and $t_{s5}$. When a reference time $t_s$, always decreased by a tape-advance time $t_1$, is attained, identification decoder 8 is switched on by switching the receiver to standby. If, for example, identification I ($t_{s1}$) appears at point $t_2$ of time, the videorecorder is switched into the recording position. At point $t_3$ of time, the identification I ($t_{s1}$) transmitted by the transmitter disappears to indicate the end of the recorded transmission, and the videorecorder is switched off.

Assume now that the transmitter-signal data line fails to occur at a point $t_4$ of time before a stored reference time $t_{s2}$ is attained. The videorecorder will then be switched on by timer clock 6 at the programmed point $t_{s2}$ of time once second stage 9 has detected a transmitter signal.

Once the videorecorder has been switched on at point $t_5$ of time by identification signal I ($t_{s3}$) and the transmission signal is totally absent at point $t_6$, meaning that neither data line nor FBAS signal is present, the videorecorder will remain in the recording position for a prescribed interval T of time, after which it will be automatically switched off. This makes the tape available for further programmed reference times $t_{s4}$ and $t_{s5}$.

Figure 3:
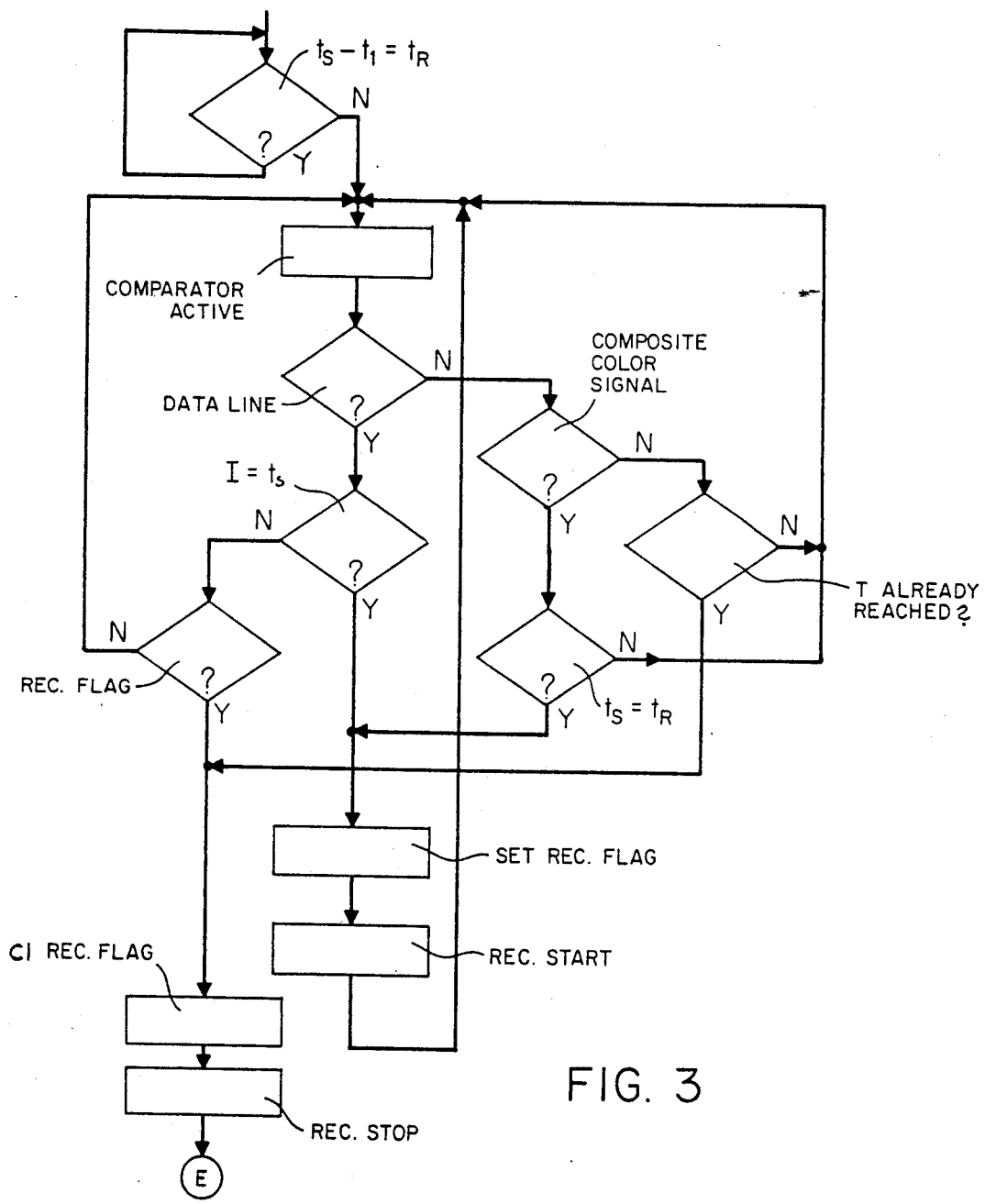
FIG. 3 is a flow chart illustrating the steps involved in automatically switching a videorecorder on and off in accordance with the device.

The flow chart in FIG. 3 illustrates the sequence of processes that occur in the circuit illustrated in FIG. 1 over time. The blocks disclosed in the known German OS No. 3 328 001 are also included. The additional stages disclosed by the present invention are emphasized by means of thicker lines.

A polling loop at the beginning of the chart decides whether the programmed reference time $t_s$ minus advance time $t_1$ is greater than real time $t_R$. The videorecorder receiving stages are activated once point $t_s$-$t_1$ of time has been attained. A test is now carried out to establish whether the data line is present. If it is, the recorder flag is set when the identification signal appears, and the videorecorder is started. The tape is threaded in and the capstan and head-drum motors started. If the aforesaid time has not yet been attained, the recorder flag is erased and the recorder stopped or the loop rerun from the beginning.

The additional data-line test makes it possible in conjunction with on FBAS signal test to design the process such that, should the data line fail to occur due to a defect in either the transmitter or the receiver decoder, the videorecorder will start at the desired preprogrammed time, controlled specifically that is, in relation to time by means of the timer even though not previously event-controlled. It must admittedly be taken into consideration in this case that the desired transmission will be recorded too early or too late, although it will, in contrast to the known device, at least be recorded. The FBAS signal is accordingly tested in conjunction with data-line testing. If the FBAS signal is present, the videorecorder is shifted into the recording position. If it is still impossible to detect on FBAS signal in the absence of the data line for a prescribed time T (e.g. 10 minutes), the recorder flag is erased and the videorecorder shifted into the stop position. This makes it possible to process even later preprogrammed memory locations and still have tape available for further recording.

To perfect the system the device can be expanded such that, when the FBAS signal disappears during recording, when the transmitter fails for instance, causing a postponement of the other stored program-activation times so that recording will no longer occur, there will be a special acknowledgement of the programmed memory locations in question, signaling the user that the desired transmission has not been recorded.

Provision can also be made for a special characterization expressing the fact that a particular program is not even being broadcast. It is practical for this to occur simultaneously with the empty code broadcast upon termination of transmission, at the end of the day, that is. This empty code, in conjunction with the determination that no FBAS is present, acts on all of the programmed timer locations in such a way as to indicate that the corresponding identification signal was not transmitted.

What is claimed is:

1. An arrangement for automatically switching on and off the recording system of a videorecorder having a real-time calendar clock, a memory, and a data comparator; means for entering reference data in form of the time and date corresponding to the commencement of a desired television-program as a reference value for storage in said memory; a data line source; means for receiving a cyclically simultaneously transmitted static actual value in form of an identification signal in a data line within a corresponding television signal for the duration of the program; comparing means connected to said means for receiving said transmitted static actual value and for comparing said identification signal with the stored reference data, said comparing means switching on said recording system when said identification signal coincides with said stored referenced data; means for activating reception of said actual-value identification signal and its comparison with the stored-reference data at a predetermined advanced time interval prior to the instant of real time corresponding to the stored reference time and to the stored reference date; means for testing for the presence of the data line and means for testing for the presence of a color television signal; said means for testing for the presence of the data line being connected to said data line source; means for comparing the stored reference time with the real time present in the calendar clock; said means for testing the presence of said data line activating said means for testing for the presence of a color television signal upon detecting absence of the data line; said means for testing for the presence of a color television signal activating said means for comparing the stored reference time with the real time present in the calendar clock upon detecting the presence of a color television signal and switching on the videorecorder when the stored reference time coincides with the real time present in the calendar clock; motor means for driving said videorecorder; means for measuring a predetermined time interval for switching off said motor means; and means for switching off said motor means subsequent to said predetermined interval of time in the absence of a transmitted color television signal and switching the videorecorder over to standby so that the next stored point of switch-on time can be tested for.

* * * * *